US009135924B2

(12) United States Patent
Hayakawa et al.

(10) Patent No.: US 9,135,924 B2
(45) Date of Patent: Sep. 15, 2015

(54) NOISE SUPPRESSING DEVICE, NOISE SUPPRESSING METHOD AND MOBILE PHONE

(75) Inventors: Shoji Hayakawa, Kawasaki (JP); Naoshi Matsuo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 1126 days.

(21) Appl. No.: 12/453,173

(22) Filed: Apr. 30, 2009

(65) Prior Publication Data

US 2010/0008519 A1 Jan. 14, 2010

(30) Foreign Application Priority Data

Jul. 11, 2008 (JP) ................................ 2008-181651

(51) Int. Cl.

*H04B 15/00* (2006.01)
*G10L 21/0208* (2013.01)
*G10L 21/0224* (2013.01)
*G10L 21/0216* (2013.01)

(52) U.S. Cl.

CPC ......... *G10L 21/0208* (2013.01); *G10L 21/0216* (2013.01); *G10L 21/0224* (2013.01); *G10L 2021/02165* (2013.01); *G10L 2021/02166* (2013.01)

(58) Field of Classification Search

CPC ................. G10L 21/0208; G10L 2021/02165; G10L 21/0224; H04R 2410/05; H04R 25/407; H04R 3/05

USPC ................................................ 381/94.7, 94.1

See application file for complete search history.

(56) References Cited

U.S. PATENT DOCUMENTS

| | | | | |
|---|---|---|---|---|
| 6,549,630 | B1 * | 4/2003 | Bobisuthi | 381/94.7 |
| 6,795,713 | B2 * | 9/2004 | Housni | 455/550.1 |
| 2002/0064287 | A1 | 5/2002 | Kawamura et al. | |
| 2006/0143017 | A1 | 6/2006 | Sonoura et al. | |

FOREIGN PATENT DOCUMENTS

| | | | |
|---|---|---|---|
| CA | 2 465 552 | A1 | 5/2003 |
| CN | 1589127 | A | 3/2005 |

(Continued)

OTHER PUBLICATIONS

Korean Office Action issued Sep. 24, 2010 in corresponding Korean Patent Application 10-2009-38395.

(Continued)

*Primary Examiner* — Phat X Cao
*Assistant Examiner* — Diana C Vieira
(74) *Attorney, Agent, or Firm* — Staas & Halsey LLP

(57) ABSTRACT

There is provided a noise suppressing device, for suppressing a noise component contained in a sound, including: at least two sound receiving parts receiving sounds from a plurality of directions containing a sound from a direction of a given sound source and converting the sounds to digital sound signals in a time domain, respectively; an estimating part acquiring both direction information on a direction of the given sound source and distance information on a distance from the given sound source based upon the digital sound signals converted by the sound receiving parts, and estimating a component value of a noise component contained in the signal by use of the direction information and the distance information; and a controlling part acquiring a control value of a suppression amount for controlling a range of a direction of the digital sound signals.

15 Claims, 11 Drawing Sheets

(56) References Cited

FOREIGN PATENT DOCUMENTS

| | | |
|---|---|---|
| JP | 9-311698 | 12/1997 |
| JP | 10-126878 | 5/1998 |
| JP | 10-133689 | 6/1998 |
| JP | 11-259090 | 9/1999 |
| JP | 2000-330598 | 11/2000 |
| JP | 2001-100800 | 4/2001 |
| JP | 2001-309483 | 11/2001 |
| JP | 2002-204493 | 7/2002 |
| JP | 2004-187283 | 7/2004 |
| JP | 2006-181651 | 7/2006 |
| JP | 2006-197552 | 7/2006 |
| JP | 2006-227328 | 8/2006 |
| JP | 2008-153743 | 7/2008 |
| JP | 2009-20471 | 1/2009 |
| KR | 2001-0002605 | 1/2001 |

OTHER PUBLICATIONS

Kaneda, Yutaka, "Applications of Digital Filters to Microphone Systems", *Acoustical Society of Japan*, vol. 45, No. 2, 1989, pp. 125-128.

Japanese Office Action mailed Feb. 12, 2013, issued in corresponding Japanese Patent Application No. 2008-181651.

Japanese Office Action mailed May 8, 2012 issued in corresponding Japanese Patent Application No. 2008-181651.

* cited by examiner

NOISE SUPPRESSING DEVICE, NOISE SUPPRESSING METHOD AND MOBILE PHONE

CROSS-REFERENCE OF RELATED APPLICATION

This application is based upon and claims the benefit of priority of the prior Japanese Patent Application No. 2008-181651, filed on Jul. 11, 2008, the entire contents of which are incorporated herein by reference.

FIELD

The embodiments described herein relates to a noise suppressing device and a method for suppressing a sound signal from a direction other than a given direction in sound signals obtained by receiving sounds from a plurality of directions, and a mobile phone provided with the noise suppressing device.

BACKGROUND

There has been developed a microphone array device that has a plurality of sound receiving parts receiving sounds, respectively converting the sounds to sound signals and outputting the signals, such as condenser microphones, and performs a variety of sound processing based upon the sound signals outputted from the respective sound receiving parts. There are cases where the microphone array device is configured so as to perform "delay-and-sum" processing for synchronizing the respective sound signals outputted from the respective sound receiving parts and adding up the synchronization values to emphasize a target sound. Further, there are cases where the microphone array device is configured so as to perform noise suppression by synchronous subtraction processing for synchronizing the respective sound signals and subtracting the one from the other to form a blind spot with respect to a noise source (e.g., Kaneda, Yutaka, "Response of digital filters in microphone systems", *Acoustical Society of Japan,* 45(2), pp. 125-128, 1989).

Noise suppressing processing and target sound emphasizing processing as microphone array processing performed by the microphone array device, such as the synchronous addition processing and the synchronous subtraction processing, certainly causes occurrence of distortion of the sound signal after execution of the processing. Especially when the microphone array processing is performed on a sound signal received in a quiet environment, a distortion that occurred due to the microphone array processing is highly visible. On the other hand, as for a sound signal received in a noisy environment, even when a certain degree of distortion occurs in the signal, suppressing noise by the microphone array processing leads to improvement in sound quality.

Accordingly, there has hitherto been used a noise suppressing device configured so as to switch whether or not to execute the microphone array processing in accordance with an ambient noise level. FIG. 11 is a block diagram illustrating an example of embodiments of the conventional noise suppressing device. The conventional noise suppressing device includes sound receiving parts 101, 102, a noise level estimating part 103, a noise suppression processing controlling part 104, switches 105, 106, 109, a noise suppression processing part 107, microphone array processing part 108, and the like.

Based upon a received sound, the sound receiving part 101 performs conversion to a sound signal as an electric signal, and sends the converted sound signal to the noise level estimating part 103 and the switch 105. Based upon a received sound, the sound receiving part 102 performs conversion to a sound signal as an electric signal, and sends the converted sound signal to the switch 106.

It is to be noted that the sound signals (analog signals) outputted from the sound receiving parts 101, 102 are amplified by an amplifier (not illustrated), converted by an analog/digital converter (hereinafter referred to as A/D converter) (not illustrated) to the digital signal, and then sent to the noise level estimating part 103 and the switches 105, 106.

The noise suppression processing part 107 acquires a sound signal outputted from one end of the switch 105, and performs the noise suppressing processing based upon the acquired sound signal. Specifically, based upon a sound signal outputted from one microphone (sound receiving part 101), the noise suppression processing part 107 performs processing for detecting a noise component included in this sound signal and removing the detected noise component from the sound signal.

The microphone array processing part 108 acquires sound signals outputted from respective one ends of the switches 105, 106, and performs microphone array processing such as the "delay-and-sum" processing or the synchronous subtraction processing, based upon the acquired sound signals. The noise level estimating part 103 estimates an ambient noise level based upon the sound signal outputted from the sound receiving part 101. Further, the noise suppression processing controlling part 104 controls the switches 105, 106, 109 based upon the noise level estimated by the noise level estimating part 103.

When the noise level estimated by the noise level estimating part 103 is equal to or greater than a given value, the noise suppression processing controlling part 104 controls switching of the switches 105, 106 so as to output the sound signals from the sound receiving parts 101, 102 to the microphone array processing part 108. Further, at this time, the noise suppression processing controlling part 104 controls switching of the switch 109 so as to output the sound signal from the microphone array processing part 108 to the outside.

Meanwhile, when the noise level estimated by the noise level estimating part 103 is smaller than the given value, the noise suppression processing controlling part 104 controls switching of the switches 105, 106 so as to output only the sound signal from the sound receiving part 101 to the noise suppression processing part 107. Further, at this time, the noise suppression processing controlling part 104 controls switching of the switch 109 so as to output the sound signal from the noise suppression processing part 107 to the outside.

With such an example of a configuration, in the case of the quiet ambient environment, the noise suppressing device is capable of performing the noise suppressing processing by the noise suppression processing part 107 by use of one microphone, and in the case of the noisy ambient environment, the noise suppressing device is capable of performing the microphone array processing by the microphone array processing part 108. Therefore, the noise suppressing device is capable of suppressing noise by the processing in accordance with an ambient environment, which leads to improvement in target sound quality.

SUMMARY

There is provided a noise suppressing device according to one aspect for suppressing a noise component. The noise suppressing device, for suppressing a noise component contained in a sound, including: at least two sound receiving parts receiving sounds from a plurality of directions containing a sound from a direction of a given sound source and converting the sounds to digital sound signals in a time domain, respectively; an estimating part acquiring both direction information on a direction of the given sound source and distance information on a distance from the given sound source based upon the digital sound signals converted by the sound receiving parts, and estimating a component value of a noise component contained in the signal by use of the direction information and the distance information; a controlling part acquiring a control value of a suppression amount for controlling a range of a direction of the digital sound signals, which are converted by the at least two sound receiving parts, to be suppressed; a suppressing part suppressing a signal from a direction other than the direction of the given sound source by use of the component value and the control value; and an outputting part outputting a signal in which the signal from the direction other than the direction of the given sound source is suppressed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF THE EMBODIMENTS

As described above, since an ambient noise level is estimated only based upon a sound signal from one sound receiving part 101, a sound from a target sound source cannot be distinguished from the other sound. In the conventional noise suppressing device, the sound from the target sound source may be included at the time of estimation of the noise level. In the case of estimating the noise level based upon a non-stationary noise, an accurate noise level cannot be obtained.

A noise suppressing device and a noise suppressing method according to aspects of the present invention may be applied to a mobile phone as described below. This noise suppressing device and this noise suppressing method can also be applied to a voice processing device for performing a variety of processing on acquired sound signals, such as a speech recognition device for performing speech recognition by use of a sound signal obtained by receiving a sound.

A mobile phone according to Embodiments 1 to 6 which will be illustrated below suppresses a noise from a sound signal by synchronous subtraction for sound signals in a time domain.

Embodiment 1

Figure 1A:
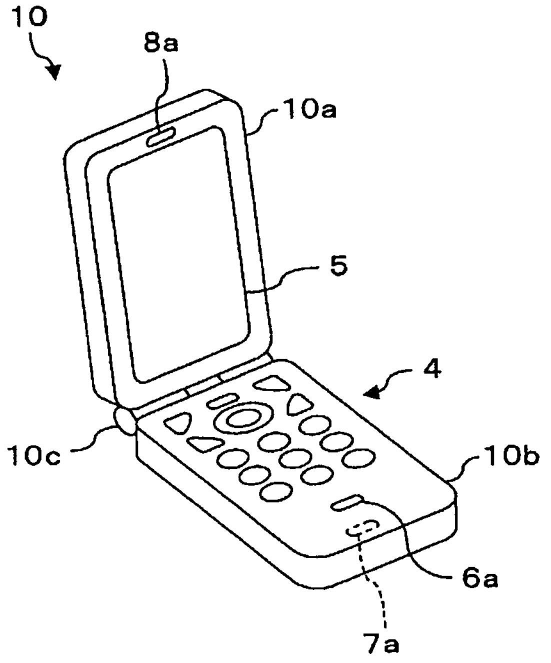
FIG. 1A is a schematic view illustrating an example of a configuration of a mobile phone according to Embodiment 1.
Figure 1B:
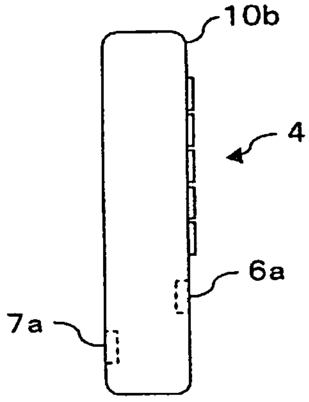
FIG. 1B is a schematic view illustrating an example of a configuration of the mobile phone according to Embodiment 1.

As the following, a mobile phone embedded with a noise suppressing device according to Embodiment 1 is described. FIG. 1A and FIG. 1B are schematic views illustrating examples of embodiments of the mobile phone of Embodiment 1, respectively. FIG. 1A illustrates an appearance perspective view of a mobile phone 10, and FIG. 1B illustrates a view of a housing having an operating part 4 of the mobile phone 10 seen from the front side.

The mobile phone 10 of present Embodiment 1 is a folding mobile phone formed by coupling between a first housing 10*a* having a displaying part 5 and a second housing 10*b* having an operating part 4 through a hinge part 10*c*. It is to be noted that the noise suppressing device displayed in the present invention is also applicable to a mobile phone other than a holding mobile phone as well as another voice input device.

The mobile phone 10 has a loudspeaker 8*a* at an end on the opposite side to the coupling part of the housing 10*a* with the hinge part 10*c*. Further, the mobile phone 10 has two microphones 6*a*, 7*a* at an end on the opposite side to the coupling part of the housing 10*b* with the hinge part 10*c*. The microphone 6*a* is provided on a side surface provided with the operating part 4 of the housing 10*b*, and the microphone 7*a* is provided on a rear surface of the side surface provided with the operating part 4 of the housing 10*b*. It is to be noted that a user of the mobile phone 10 places the loudspeaker 8*a* provided in the housing 10*a* at his or her ear, and speaks toward the microphone 6*a* provided in the housing 10*b*. Therefore, the mouth of the user (speaker) is a target sound source (given sound source) that the mobile phone 10 intends to receive.

Figure 2:
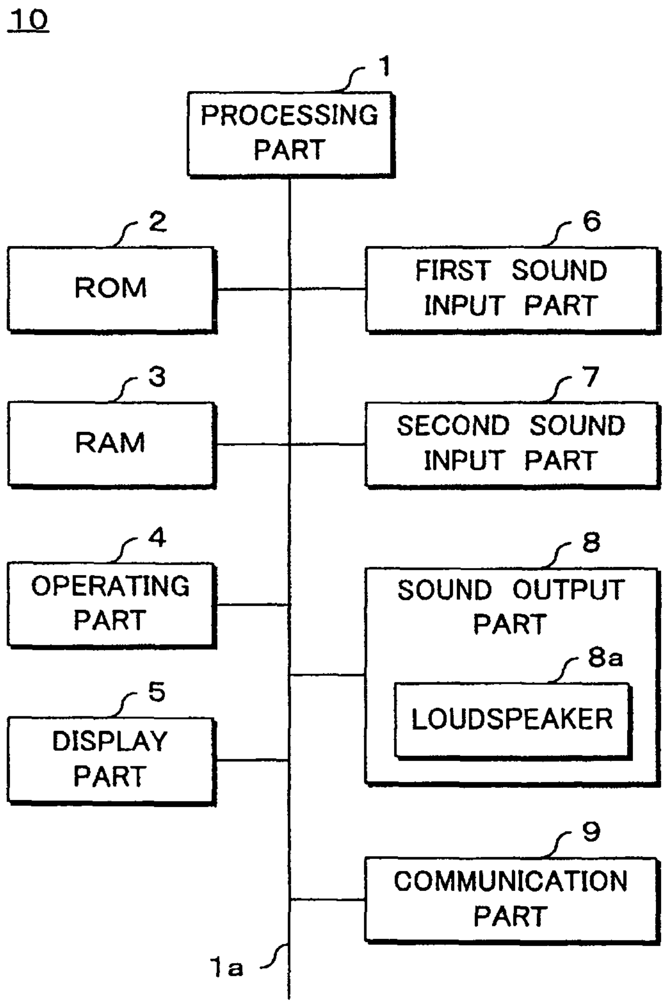
FIG. 2 is a block diagram illustrating an example of a configuration of the mobile phone according to Embodiment 1.

Referring to FIG. 2, the mobile phone 10 of Embodiment 1 includes a processing part 1, a ROM (Read Only Memory) 2, a RAM (Random Access Memory) 3, an operating part 4, a displaying part 5, a first sound input part 6, a second sound input part 7, a sound output part 8, a communicating part 9, and the like. Each of the foregoing hardware parts is mutually connected through the processing part 1*a*.

The processing part 1 is a CPU (Central Processing Unit) or an MPU (Micro Processing Unit), or the like, which reads a control program previously stored in the ROM 2 to the RAM 3 as appropriate and executes the program while controlling an operation of each of the foregoing hardware parts. The ROM 2 previously stores a variety of control programs required for activating the mobile phone 10. The RAM 3 is an SRAM, a flash memory, or the like, which temporarily stores a variety of data that are generated at the time of execution of the control program by the processing part 1.

The operating part 4 includes a variety of operational keys required for operating the mobile phone 10. When each operational key is operated by the user, the operating part 4 sends to the processing part 1 a control signal corresponding to the operated operational key, and the processing part 1 executes processing corresponding to the control signal acquired from the operating part 4.

The displaying part 5 is, for example, a liquid crystal display (LCD), which displays an operating status of the mobile phone 10, information inputted through the operating part 4, information to be notified to the user, and the like, in accordance with a direction from the processing part 1.

Figure 3:
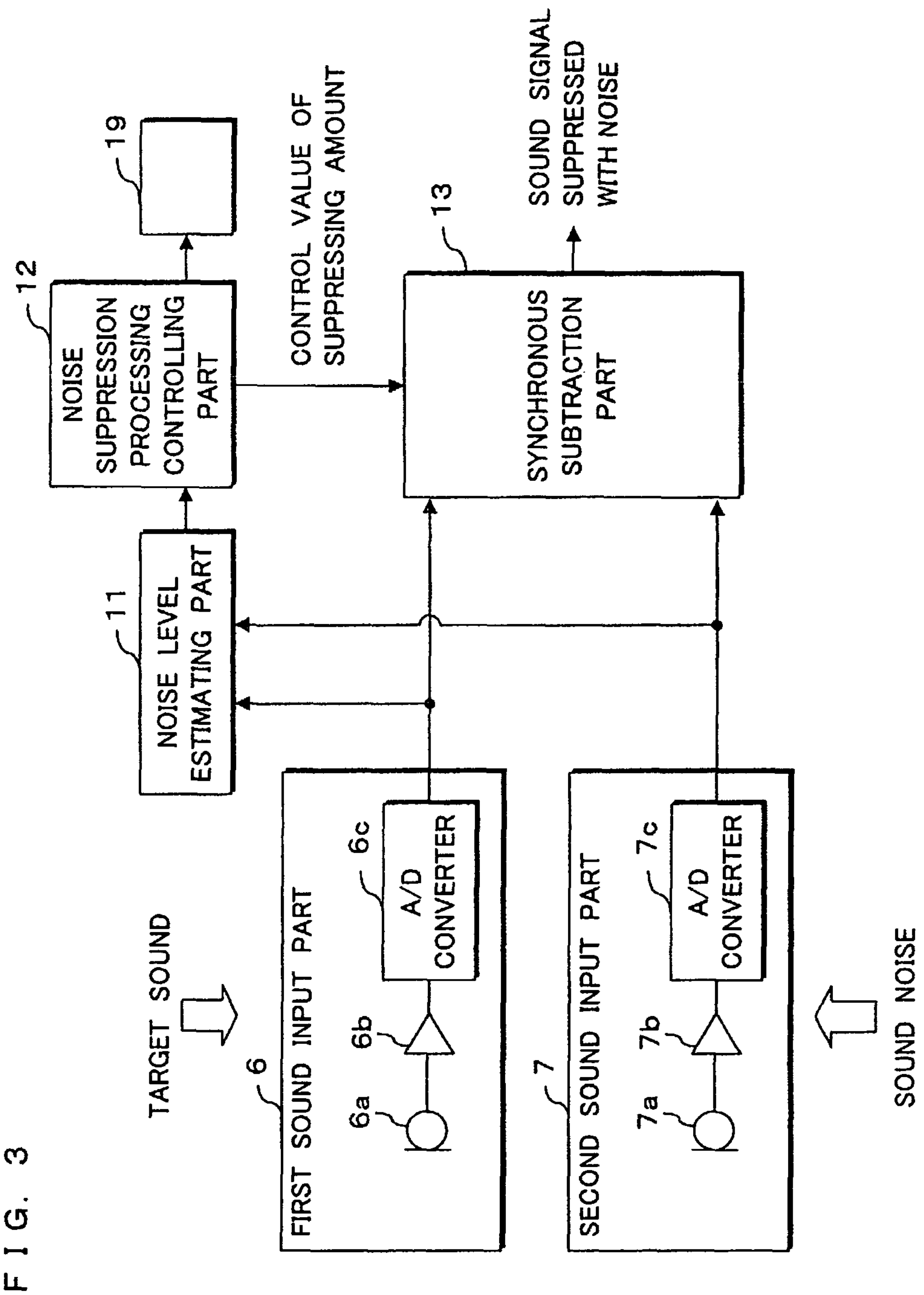
FIG. 3 is a functional block diagram illustrating an example of a functional configuration of the mobile phone according to Embodiment 1.

As illustrated in FIG. 3, a first sound input part 6 and a second sound input part 7 (sound receiving parts) respectively have the microphones 6*a*, 7*a*, amplifiers 6*b*, 7*b*, and A/D converters 6*c*, 7*c*. The microphones 6*a*, 7*a* are, for example, condenser microphones, which generate analog sound signals based upon received sounds and respectively send the generated sound signals to the amplifiers 6*b*, 7*b*.

The amplifiers 6*b*, 7*b* are, for example, gain amplifiers, which amplify the analog sound signals inputted from the microphones 6*a*, 7*a*, and respectively send the obtained analog sound signals to the A/D converters 6*c*, 7*c*. The A/D converters 6*c*, 7*c* perform processing by a filter such as a low pass filter (LPF) on the analog sound signals inputted from the amplifiers 6*b*, 7*b*, or perform digitizing with a sampling frequency of 8000 Hz in the case of the mobile phone, to convert the analog sound signals to digital sound signals. The first sound input part 6 and the second sound input part 7 send the digital sound signals obtained by the A/D converters 6*c*, 7*c* to a given output destination.

The sound output part 8 has a loudspeaker 8*a* that outputs a sound, a digital/analog converter, an amplifier (neither are illustrated), and the like. The sound output part 8 converts the digital sound signal to be voice-outputted to an analog sound signal by the digital/analog converter, then amplifies the sound signal with the amplifier, and outputs a sound based upon the amplified sound signal from the speaker (loud speaker) 8*a*.

The communicating part 9 is an interface for connection to a network (not illustrated), which performs communication with external devices, such as another mobile phone and a computer, through the network (communication line). It should be noted that the communicating part 9, for example, outputs sound signals acquired by the first sound input part 6 and the second sound input part 7 to a mobile phone of a party on the other end of communication (talk).

Below described are functions of the mobile phone 10 including the foregoing embodiment, which are realized by the processing part 1 executing a variety of control programs stored in the ROM 2 in the mobile phone 10. FIG. 3 is a functional block diagram illustrating a functional embodiment of the mobile phone 10 of Embodiment 1. In the mobile phone 10 of present Embodiment 1, the processing part 1 executes the control programs stored in the ROM 2, to realize respective functions of a noise level estimating part 11, a noise suppression processing controlling part 12, a synchronous subtracting part 13, a setting part 19, and the like.

It should be noted that each of the noise level estimating part 11, the noise suppression processing controlling part 12, the synchronous subtracting part 13 and the setting part 19 is not restricted to embodiments realized by the processing part 1 executing the control program stored in the ROM 2. For example, each of the foregoing parts may be realized by a digital signal processor (DSP) incorporated with a computer program disclosed in the present application and a variety of data.

The first sound input part 6 and the second sound input part 7 respectively send sound signals obtained by receiving sounds to the noise level estimating part 11 and the synchronous subtracting part 13. The first sound input part 6 and the second sound input part 7 receive sounds including a sound made from the mouth of the speaker as the target sound source (target sound) and the other sound (noise), and coming from the surroundings toward the mobile phone 10.

The noise level estimating part (estimating part) 11 estimates a level of a noise component included in the sound signal (noise level, component value of a noise component) based upon the sound signals respectively inputted from the first sound input part 6 and the second sound input part 7. It should be noted that the level of the noise component is a value indicating an amount of ambient noise of the mobile phone 10.

Further, based upon direction information illustrating a direction of the target sound source (here, the mouth of the speaker), the noise level estimating part 11 of Embodiment 1 directs directivity in a direction other than the direction of the target sound source, and estimates the level of the noise component level based upon a sound coming from direction other than the direction of the target sound source. Therefore, since the sound made from the speaker (target sound) is not used for the estimation of the noise level, it is possible to accurately estimate the noise level. The noise level estimating part 11 sends the estimated noise level to the noise suppression processing controlling part 12. It should be noted that not only the information on the direction of the target sound source but information on a distance to the target sound source may be used. An embodiment also using the information on the distance to the target sound will be described in Embodiment 2.

The noise suppression processing controlling part (control part) 12 decides a suppression-amount control value (control value of a suppression amount) for controlling a suppression amount of the noise component to be suppressed by synchronous subtraction processing that is performed by the synchronous subtracting part 13 based upon the level of the noise component estimated by the noise level estimating part 11. The noise suppression processing controlling part 12 sends the decided suppression-amount control value to the synchronous subtracting part 13, thereby to control the range of the direction (directivity) of the sound signal to be suppressed by the synchronous subtracting part 13 in accordance with the level of the noise component.

The synchronous subtracting part (suppressing part) 13 performs the synchronous subtraction processing according to the suppression-amount control value inputted from the noise suppression processing controlling part 12, in which the sound signal, obtained by multiplying the sound signal acquired by the second sound input part 7 by a delay, is subtracted from the sound signal acquired by the first sound input part 6. This forms a blind spot, from which the sound is less received, in the inverse direction to the target sound source, to suppress the sound coming from the direction other than the target sound source (noise) so as to generate a sound signal in which the sound coming from the target sound source (target sound) is emphasized. The synchronous subtracting part 13 sends the sound signal subjected to the synchronous subtraction processing to the given output destination.

The synchronous subtracting part 13, for example, sends the sound signal subjected to the synchronous subtraction processing to the communicating part 9 in the case of transmitting the sound signals acquired by the sound input parts 6, 7 to the mobile phone of the party on the other end of communication (talk). It is to be noted that the communicating part 9 transmits the acquired sound signal to the terminal of the party on the other end of communication as a telephone message. Further, in a case where the mobile phone 10 has embodiments including a speech recognition processing part and performs speech recognition processing based upon the sound signal acquired by the sound input parts 6, 7, the synchronous subtracting part 13 sends the sound signal subjected to the synchronous subtraction processing to the speech recognition processing part.

Figure 4:
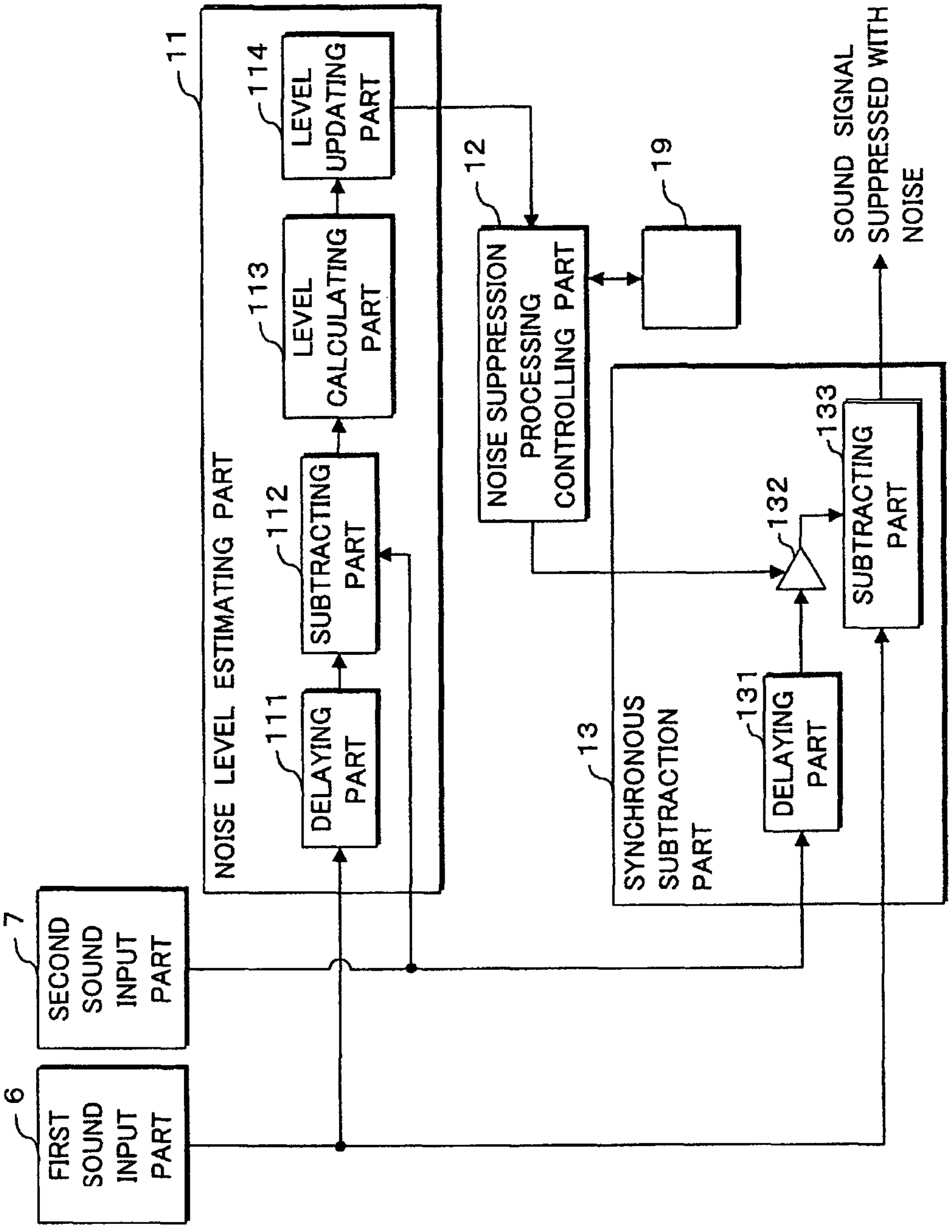
FIG. 4 is a functional block diagram illustrating an example of a functional configuration of the mobile phone according to Embodiment 1.

In the following, detailed configurations of the noise level estimating part 11 and the synchronous subtracting part 13 are described. Referring to FIG. 4, in the mobile phone 10 of present Embodiment 1, the noise level estimating part 11 has respective functions of a delaying part 111, a subtracting part 112, a level calculating part 113, a level updating part 114, and the like.

The sound signal from the first sound input part 6 that is inputted into the noise level estimating part 11 is inputted into the delaying part 111, and the sound signal from the second sound input part 7 that is inputted into the noise level estimating part 11 is inputted into the subtracting part 112. The delaying part 111 delays the sound signal inputted from the first sound input part 6 by given delay time. The delay time is time depending upon a distance between a position where the microphone 6*a* is provided and a position where the microphone 7*a* is provided. The delaying part 111 sends the delayed sound signal from the first sound input part 6 to the subtracting part 112.

Figure 5:
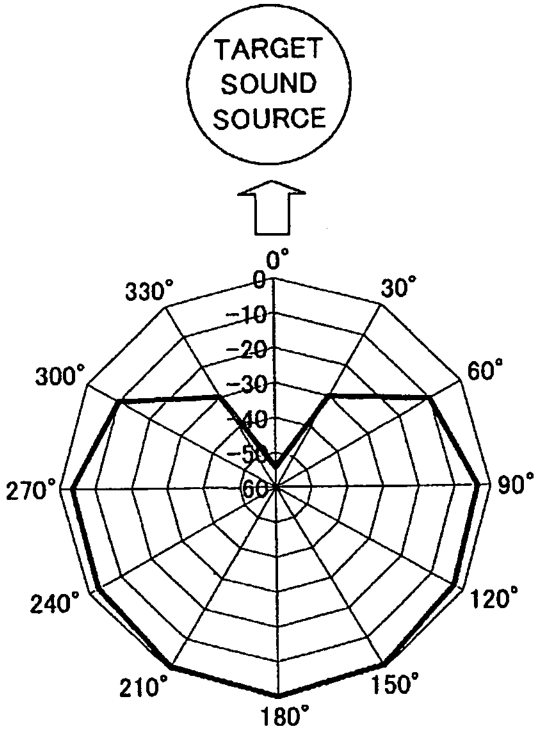
FIG. 5 is a schematic view illustrating an example of a directional pattern of a sound signal outputted from a subtracting part of a noise level estimating part.

The subtracting part 112 subtracts the sound signal inputted from the delaying part 111 from the sound signal inputted from the second sound input part 7, and sends the obtained sound signal to the level calculating part 113. The sound signal obtained by the subtraction processing by the subtracting part 112 is a sound signal having directivity as illustrated in FIG. 5. In the pattern illustrated in FIG. 5, in the range of 360 degrees in a horizontal direction with the mobile phone 10 regarded as the center, a suppression amount with respect to a sound signal, coming from each direction at every 30 degrees clockwise with the direction of the target sound source regarded as a reference (each value from 0 dB to −60 dB in FIG. 5), is indicated with a value at 180 degrees taken as 0 dB.

The pattern illustrated in FIG. 5, for example, indicates that suppression of 55 dB is applied to a sound signal obtained by receiving a sound from the direction of the target sound source (direction at 0 degree), and suppression of 30 dB is applied to a sound signal obtained by receiving a sound from a direction at 30 degrees clockwise with the direction of the target sound source regarded as the reference.

The directivity of the pattern illustrated in FIG. 5 is directivity not including the direction of the target sound source. Namely, the sound signal outputted from the subtracting part 112 becomes a sound signal from the direction other than the target sound source since the target sound source from the target sound source is suppressed. Here, the signal from the direction other than the target sound source is referred to as noise, and the sound signal obtained by receiving the noise is referred to as a noise signal.

The level calculating part 113 calculates a level of the sound signal received with the directivity as illustrated in FIG. 5 (noise level of the noise signal), having been inputted into the subtracting part 112, and sends the calculated level to the level updating part 114. The level updating part 114 updates the noise level having been calculated by the level calculating part 113 at given timing, and sends the updated signal level to the noise suppression processing controlling part 12.

It should be noted that the level updating part 114 may update the noise level acquired from the level calculating part 113 to a new noise level, or may update a noise level hitherto calculated by the level calculating part 113 (past noise level) to a new noise level. In the case of considering the past noise level, the level updating part 114, for example, multiplies the past noise level by a given value (e.g. a value equal to or larger than 0 and equal to or smaller than 1, such as 0.9 or 0.99), multiples the newly calculated noise level by a value obtained by subtracting a given value from 1 (e.g. 0.1, 0.01), and adds up the obtained values, to obtain a value as a newly noise level. It is to be noted that calculating a noise level in such processing can prevent erroneous estimation of a noise level even in the case of an abrupt change in signal level of the sound signal acquired by the sound input parts 6, 7 due to an impact on the housing body, or the like.

Using the noise level inputted from the noise level estimating part 11, the noise suppression processing controlling part 12 sets a suppression-amount control value in accordance with the noise level, and inputs the set value into the correcting part 132 of the synchronous subtracting part 13. The suppression-amount control value is a value for controlling a suppression amount of a noise component to be suppressed by the synchronous subtraction processing by the synchronous subtracting part 13, and the larger the suppression-amount control value, the larger the suppression amount of the noise component.

Using the noise level inputted from the noise level estimating part 11 through the noise suppression processing controlling part 12 and the suppression-amount control value acquired from the noise suppression processing controlling part 12, the setting part 19 determines whether or not the noise level is equal to or larger than a given value (referred to as a first threshold). When the noise level becomes equal to or larger than the first threshold, the setting part 19 sets the given value (referred to as a first control value) to the suppression-amount control value (control value), so as to control the range of the direction of the signal to be suppressed by the noise suppression processing controlling part 12 as being widest. Further, using the noise level and the suppression-amount control value, the setting part 19 determines whether or not the noise level is smaller than a given value (referred to as a second threshold). When the noise level becomes smaller than the second threshold, the setting part 19 sets the given value (referred to as the second control value) to the suppression-amount control value (control value), so as to control the range of the direction of the signal to be suppressed by the noise suppression processing controlling part 12 as being narrowest. The setting part 19 outputs the set suppression-amount control value (control value) back to the noise suppression processing controlling part 12.

When the suppression-amount control value inputted from the setting part 19 differs from the suppression-amount control value already set by the noise suppression processing controlling part 12 using the noise level inputted from the noise level estimating part 11, the noise suppression processing controlling part 12 updates the suppression-amount control value to the suppression-amount control value inputted from the setting part 19. It is to be noted that the foregoing functions of the noise suppression processing controlling part 12 and the setting part 19 setting suppression-amount control values by use of the first threshold and the second threshold are detailed in a description of the mobile phone 10 of Embodiment 5.

The suppression-amount control value is a value equal to or larger than 0 and equal to or smaller than 1. In the case of a low noise level and quiet surroundings, the noise suppression processing controlling part 12 brings the suppression-amount control value closer to 0, and in the case of a high noise level and noisy surroundings, the noise suppression processing controlling part 12 brings the suppression-amount control value closer to 1. Therefore, the suppression amount of the noise component to be suppressed by the synchronous subtraction processing is controlled so as to become larger in noisier surroundings.

Further, in the mobile phone 10 of present Embodiment 1, the synchronous subtracting part 13 has respective functions of a delaying part 131, a correcting part 132, a subtracting part 133, and the like.

The sound signal from the first sound input part 6 that is inputted into the synchronous subtracting part 13 is inputted into the subtracting part 133, and the sound signal from the second sound input part 7 that is inputted into the synchronous subtracting part 13 is inputted into the delaying part 131. The delaying part 131 delays the sound signal inputted from the second sound input part 7 by given delay time. The delay time is time depending upon a distance between a position where the microphone 6*a* is provided and a position where the microphone 7*a* is provided. The delaying part 131 sends the delayed sound signal from the second sound input part 7 to the correcting part 132.

The correcting part 132 multiples the sound signal inputted from the delaying part 131 by the suppression-amount control value inputted from the noise suppression processing controlling part 12, and sends the obtained value to the subtracting part 133 as the sound signal synchronizing with the noise component. It should be noted that the sound signal multiplied by the suppression-amount control value and synchronized with the noise is the suppression amount of the noise component to be suppressed, and the sound signal to be subtracted from the sound signal from the first sound input part 6. The subtracting part 133 subtracts from the correcting part 132 the suppression amount inputted from the first second input part 6 (sound signal multiplied by the suppression-amount control value), and sends the obtained sound signal to the given output destination.

It is to be noted that, since the sound signal from the second sound input part 7 is delayed by the delaying part 131 so as to be synchronized with the noise coming from a side surface side provided with the microphone 7*a* of the housing 10*b* which is illustrated in FIG. 1B to the microphone 6*a*, the sound signal outputted from the correcting part 132 becomes a sound signal for suppressing the noise coming from the side surface side provided with the microphone 7*a* of the housing 10*b* to the microphone 6*a* by means of the synchronous subtraction. By subtracting such a sound signal from the sound signal from the first sound input part 6, the subtracting part 133 can output a sound signal subjected to the noise suppression with a blind spot of the directivity formed on the side surface side provided with the microphone 7*a* of the housing 10*b*.

Figure 6A:
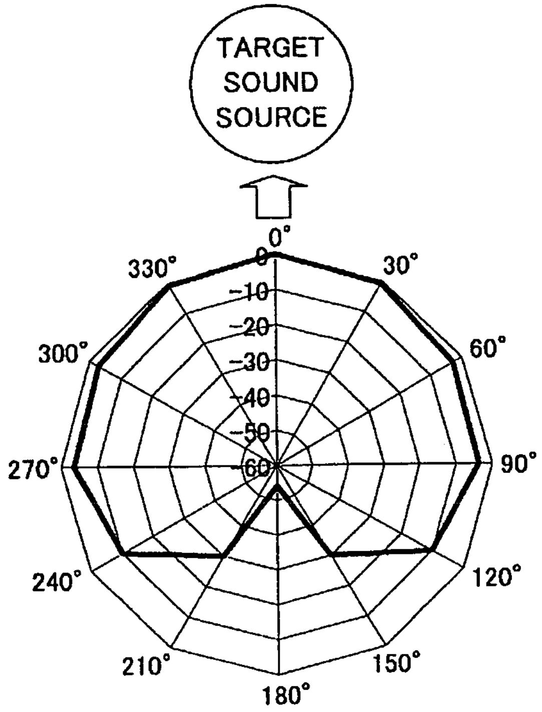
FIG. 6A is a schematic view illustrating an example of a pattern of directivity of a sound signal subjected to synchronous subtraction.
Figure 6B:
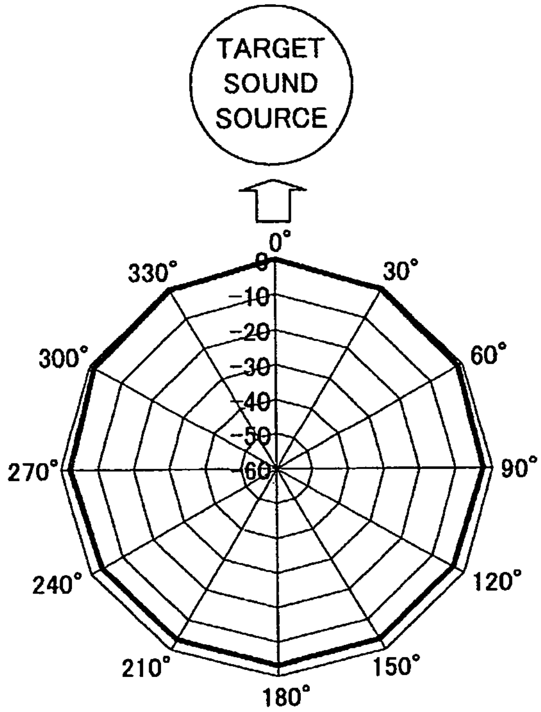
FIG. 6B is a schematic view illustrating another example of a pattern of the directivity of the sound signal subjected to synchronous subtraction.

The sound signal obtained by the subtraction processing by the subtracting part 133 is a sound signal having directivity illustrated in FIG. 6A and FIG. 6B. FIG. 6A illustrates the pattern of the directivity of the sound signal outputted from the synchronous subtracting part 13 in the case of the suppression-amount control value being 1, and FIG. 6B illustrates the pattern of the directivity of the sound signal outputted from the synchronous subtracting part 13 in the case of the suppression-amount control value being 0.

In the patterns illustrated in FIGS. 6A and 6B, as the pattern illustrated in FIG. 5, in the range of 360 degrees in a horizontal direction with the mobile phone 10 regarded as the center, a suppression amount with respect to a sound signal, coming from each direction at every 30 degrees clockwise with the direction of the target sound source regarded as a reference, is indicated with a value at 0 degree taken as 0 dB.

It is to be noted that the directivity of the pattern illustrated in FIG. 6A is directivity in the case of the suppression-amount control value being close to 1, namely the case of a high noise level and noisy surroundings, and a blind spot is formed in the opposite side to the target sound source. Namely, in the case of the high noise level and the noisy surroundings of the mobile phone 10, the synchronous subtracting part 13 suppresses a sound signal from the inverse direction to the target sound source, thereby to generate a sound signal with the sound signal from the target sound source emphasized.

Further, the directivity of the pattern illustrated in FIG. 6B is directivity in the case of the suppression-amount control value being close to 0, namely the case of a low noise level and quiet surroundings, indicating every direction of the surroundings of the mobile phone 10. Namely, in the case of the low noise level and the quiet surroundings of the mobile phone 10, the synchronous subtracting part 13 does not perform the noise suppression, and generates a sound signal of a sound from every direction.

According to the foregoing processing, in the case of the noisy surroundings, the suppression-amount control value outputted from the noise suppression processing controlling part 12 becomes a value close to 1, and the sound signal, which is synchronizing with the noise component, outputted from the correcting part 132 becomes large. In this case, the synchronous subtracting part 13 makes the range of the direction, from which the sound of the sound signal to be suppressed comes, wide and outputs a sound signal in which the sound signal from the wide range of the direction other than the direction of the target sound source is suppressed. Therefore, in the case of the noisy surroundings, the mobile phone 10 receives a sound signal from a narrow range of the direction of the target sound, thereby allowing efficient suppression of a noise component.

Further, in the case of the quiet surroundings, the suppression-amount control value outputted from the noise suppression processing controlling part 12 becomes a value close to 0, and the sound signal, which is synchronizing with the noise component, outputted from the correcting part 132 becomes small. In this case, the synchronous subtracting part 13 makes the blind spot, formed in the direction from which the sound of the sound signal to be suppressed comes, weak (small), thereby to make a non-suppressed range wide. Hence, in the case of the quiet surroundings, by receiving a sound signal from the wide range, the mobile phone 10 can prevent deterioration in target sound quality due to the noise suppression.

As thus described, changing the suppression-amount control value in accordance with the ambient noise level can change the range of the direction from which the sound of the sound signal to be suppressed comes, so as to control the directivity in the noise suppressing device in accordance with the ambient noise level.

In the following, the noise suppressing processing by the mobile phone 10 of present Embodiment 1 is described based upon an operation chart. It is to be noted that the following processing is executed by the processing part 1 in accordance with the control program stored in the ROM 2 of the mobile phone 10.

Figure 7:
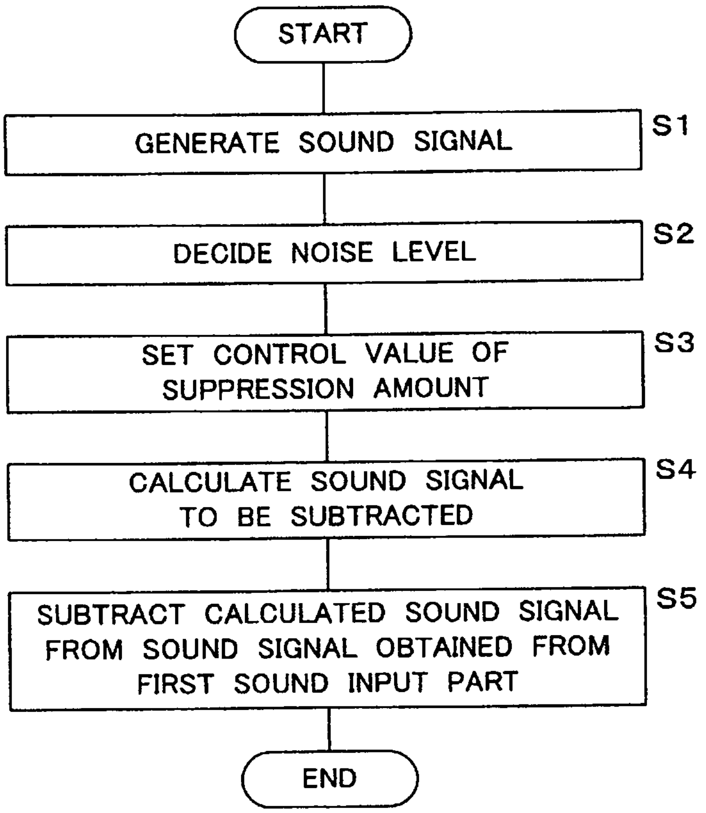
FIG. 7 is an operation chart illustrating an example of a procedure for noise suppression processing.

Referring to FIG. 7, for example, when communication (talk) with another mobile phone is started, the processing part 1 of the mobile phone 10 receives sounds by the first sound input part 6 and the second sound input part 7, and generates sound signals (at S1). Based upon the generated sound signals, the processing part 1 (noise level estimating part 11) decides a level of a noise component included in the sound signal (noise level) (at S2). Further, based upon the decided noise level, the processing part 1 (noise suppression processing controlling part 12) sets a suppression-amount control value in accordance with the noise level (at S3).

The processing part 1 (synchronous subtracting part 13) calculates a sound signal to be subtracted from the sound signal from the first sound input part 6, by use of the sound signal obtained by the second sound input part 7 and the suppression-amount control value set based upon the noise level (at S4). The processing part 1 subtracts the calculated sound signal to be subtracted from the sound signal obtained by the first sound input part 6 (at S5), to generate a sound signal with noise suppressed. It is thereby possible to suppress a sound signal (noise signal) based upon a sound from the range in accordance with the noise level by the synchronous subtraction processing based upon the suppression-amount control value in accordance with the noise level.

The ambient noise level is estimated based upon the directivity as illustrated in FIG. 5, specifically the sound signal obtained by receiving the sound from the direction other than the direction of the target sound source. Therefore, since the sound from the direction of the target sound source is not used for the estimation of the noise level, it is possible to estimate an accurate noise level.

Since the suppression amount of the noise to be suppressed is controlled in accordance with the ambient noise level, it is possible to realize control of the ambient noise level. Specifically, since there is inherently a little noise in the quiet ambient environment, performing control so as to make the suppression amount small and thus make the directivity wide can prevent occurrence of distortion of the sound from the target sound source and thus prevent deterioration in sound quality due to the noise suppressing processing. Further, in the noisy ambient environment, performing control so as to make the suppression amount large and thus make the directivity narrow can generate an excellent noise suppressing effect, and thus facilitate listening to a sound after the microphone array processing.

The noise suppressing device disclosed in the present application is described by taking the embodiment applied to the mobile phone 10 as the example. When the noise suppressing device disclosed in the embodiment is applied to the mobile phone 10, it can be assumed that the target sound source is the user's mouth and the target sound is a voice uttered when the user speaks. Namely, the directivity set in the direction from the microphone 6*a* provided in the mobile phone 10 to the user's mouth can be controlled in accordance with a noise level based upon the sound from the direction other than the use's mouth. This allows execution of the noise suppressing processing in response to a change in the ambient noise environment of the mobile phone 10.

Embodiment 2

In the following, a mobile phone embedded with a noise suppressing device according to Embodiment 2 is described. It is to be noted that, since the mobile phone of present Embodiment 2 can be realized by a similar embodiment to that of the foregoing mobile phone 10 of Embodiment 1, the similar embodiment is provided with the same numeral and the description thereof is omitted.

The foregoing mobile phone 10 of Embodiment 1 is configured so as to estimate the ambient noise level based upon the sound from the direction other than the direction of the target sound source. As opposed to this, the mobile phone 10 of present Embodiment 2 is configured so as to estimate the ambient noise level based upon a level of a sound signal in which a difference between the signal level of the sound signal acquired by the first sound input part 6 and the signal level of the sound signal acquired by the second sound input part 7 is smaller than a given value.

Since a sound coming from a position in the vicinity of a front surface of the mobile phone 10 (front surface of the microphone 6*a*) comes as a spherical wave to each of the microphones 6*a*, 7*a*, a signal level is attenuated depending upon a distance at which the sound proceeds. Hence the signal level in the case of being acquired by the first sound input part 6 is smaller than the signal level in the case of being acquired by the second sound input part 7. On the other hand, a sound coming from a position apart from the mobile phone 10 can be regarded as a plane wave, and a difference is small between the signal level in the case of being acquired by the first sound input part 6 and the signal level in the case of being acquired by the second sound input part 7.

Accordingly, in present Embodiment 2, the ambient noise level is estimated based upon a sound component in which the difference between the signal level acquired by the first sound input part 6 and the signal level acquired by the second sound input part 7 is smaller than a given value, namely a level of the sound coming from the position apart from the mobile phone 10.

Figure 8:
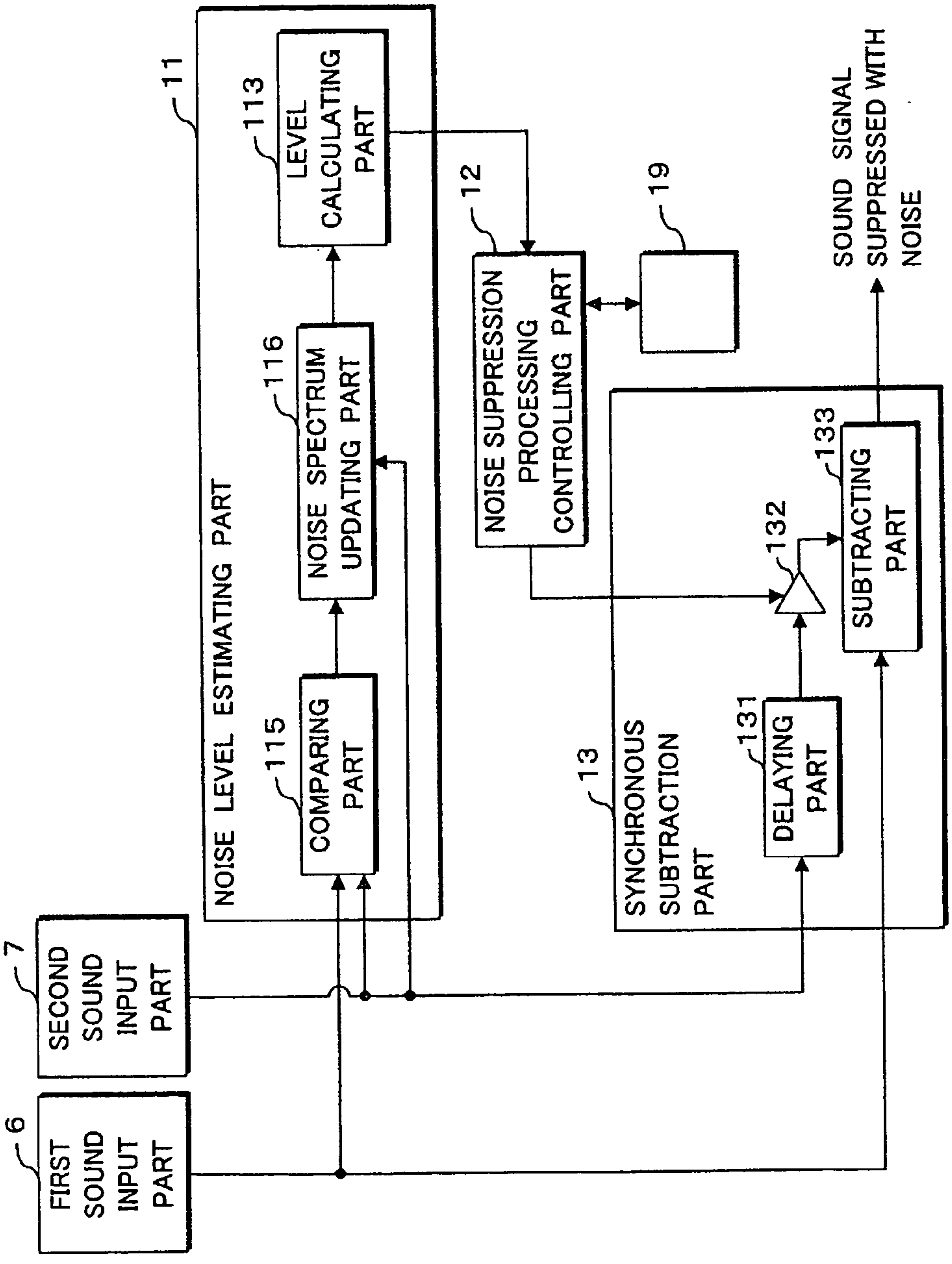
FIG. 8 is a functional block diagram illustrating an example of a functional configuration of a mobile phone of Embodiment 2.

Referring to FIG. 8, in the mobile phone 10 of present Embodiment 2, the noise level estimating part 11 that is realized by the processing part 1 has a function of a comparing part 115 in place of the delaying part 111 and the subtracting part 112 illustrated in FIG. 4, and has a function of a noise spectrum updating part 116 in place of the level updating part 114. It is to be noted that the embodiment other than this includes the same embodiment as the foregoing embodiment of Embodiment 1.

One variant regarding the noise level estimating part 11 which the processing part 1 realizes for processing the sound signal acquired by the first sound input part 6 and the sound signal acquired by the second sound input part 7 is disclosed as follows. The sound signal from the first sound input part 6 is a signal in a time domain. The sound signal from the second sound input part 7 is a signal in the time domain.

The comparing part (detecting part) 115 converts the sound signal from the first sound input part 6 and the sound signal from the second sound input part 7 into corresponding spectra in a frequency domain. The comparing part 115 calculates a difference spectrum between the converted spectra. The comparing part 115 extracts frequencies which correspond to signal levels less than a given intensity, and constructs a noise spectrum from the frequencies and the corresponding signal levels. That is to say, the noise spectrum thus constructed is identical to a difference spectrum, in which signal levels which correspond to frequencies in the difference spectrum thus calculated and are more than or equal to the given intensity have been made a value zero. The comparing part 115 performs, for example, a time-to-frequency converting processing such as Fourier transform. The comparing part 115 sends the noise spectrum thus constructed to the noise spectrum updating part 116.

The noise spectrum updating part 116 acquires the noise spectrum from the comparing part 115. The noise spectrum updating part 116 updates a noise spectrum obtained in previous updating processing to a new noise spectrum, based on the noise spectrum thus acquired. For example, the noise spectrum updating part 116 calculates a first spectrum by multiplying the noise spectrum obtained in the previous updating processing by a given value, where the given value is, for example, 0.9 or 0.99, or a value from 0 to 1. The noise spectrum updating part 116 calculates a second spectrum by multiplying the noise spectrum acquired from the comparing part 115 by a value which is obtained from subtraction of the given value from 1, where the value thus obtained is, for example, 0.1 or 0.01, or a value from 1 to 0. The noise spectrum updating part 116 regards a sum of the first spectrum and second spectrum as the new and updated noise spectrum. Preferably, these series of arithmetic procedures may be updating processing, which the noise spectrum updating part 116 performs.

The noise spectrum updating part 116 sends the new and updated noise spectrum to the level calculating part 113. The level calculating part 113 acquires the noise spectrum from the noise spectrum updating part 116. The level calculating part 113 calculates a level of the sound signal outputted from the comparing part 115, which is a noise level of the noise signal outputted from the comparing part 115. The level calculating part 113 sends the calculated noise level of the noise signal to the noise suppression processing controlling part 12.

The comparing part 115 generates distance information concerning a distance from the target sound source, based on the calculated difference spectrum. As one variant of the embodiment, the comparing part 115 may calculate a difference between the signal level of the sound signal from the first sound input part 6 and the signal level of the sound signal from the second sound input part 7 as the distance information from the target sound source, and may detect a sound signal with the difference between the signal levels of the two sound signals being smaller than a given value. The comparing part 115 sends a sound signal of the detected sound signal to the noise spectrum updating part 116. Although the distance information from the target sound source is calculated to be used, the distance information may be used along with the direction information used in Embodiment 1 concerning the direction toward the target sound source.

Another variant regarding the noise level estimating part 11 which the processing part 1 realizes for processing the sound signal acquired by the first sound input part 6 and the sound signal acquired by the second sound input part 7 is disclosed as follows. The sound signal from the first sound input part 6 is a signal in a time domain. The sound signal from the second sound input part 7 is a signal in the time domain.

The comparing part (detecting part) 115 converts the sound signal from the first sound input part 6 and the sound signal from the second sound input part 7 into corresponding spectra in a frequency domain. The comparing part 115 calculates a difference spectrum between the converted spectra. The comparing part 115 extracts frequencies which correspond to signal levels less than a given intensity, and constructs a noise spectrum from the frequencies and the corresponding signal levels. That is to say, the noise spectrum thus constructed is identical to a difference spectrum, in which signal levels which correspond to frequencies in the difference spectrum thus calculated and are more than or equal to the given intensity have been made a value zero. The comparing part 115 performs, for example, a time-to-frequency converting processing such as Fourier transform. The comparing part 115 converts the constructed noise spectrum into a noise signal in the time domain. The comparing part 115 sends the noise signal thus converted to the noise spectrum updating part 116.

The noise spectrum updating part 116 acquires the noise signal from the comparing part 115. The noise spectrum updating part 116 acquires a sound signal from the second sound input part 7. The noise spectrum updating part converts the noise signal acquired form the comparing part 115 and the sound signal acquired form the second sound input part 7 to a noise spectrum and a spectrum in a frequency domain, respectively. The noise spectrum updating part 116 updates a noise spectrum obtained in previous updating processing to a new noise spectrum, based on the converted noise spectrum from the comparing part 115 and the converted spectrum from the second sound input part 7. For example, the noise spectrum updating part 116 calculates a first spectrum by multiplying the noise spectrum obtained in the previous updating processing by a given value, where the given value is, for example, 0.9 or 0.99, or a value from 0 to 1. The noise spectrum updating part 116 calculates a second spectrum by multiplying the noise spectrum acquired from the comparing part 115 by a value which is obtained from subtraction of the given value from 1, where the value thus obtained is, for example, 0.1 or 0.01, or a value from 1 to 0. The noise spectrum updating part 116 regards a sum of the first spectrum and second spectrum as the new and updated noise spectrum. Preferably, these series of arithmetic procedures may be updating processing, which the noise spectrum updating part 116 performs.

The noise spectrum updating part 116 sends the new and updated noise spectrum to the level calculating part 113. The level calculating part 113 acquires the noise spectrum from the noise spectrum updating part 116. The level calculating part 113 calculates a level of the sound signal outputted from the comparing part 115, which is a noise level of the noise signal outputted from the comparing part 113. The level calculating part 113 sends the calculated noise level of the noise signal to the noise suppression processing controlling part 12.

The comparing part 115 generates distance information concerning a distance from the target sound source, based on the calculated difference spectrum. Although the distance information from the target sound source is calculated to be used, the distance information may be used along with the direction information used in Embodiment 1 concerning the direction toward the target sound source.

In present Embodiment 2, with the foregoing configuration, a sound component, in which the difference between the signal levels of the sound signals acquired by the two sound input parts 6, 7 is smaller than the given value, is regarded as the noise component, and the ambient noise level is estimated using this sound component. Therefore, while the noise level is estimated using a sound determined as the noise component even in the case of the sound from the direction of the target source, a voice made by the user of the mobile phone 10 in the vicinity of a front surface of the housing **10*b*** is not used for the estimation of the noise level, thereby enabling more improvement in accuracy of the estimation of the noise level.

The noise suppression processing controlling part 12 and the synchronous subtracting part 13 of present Embodiment 2 each perform similar processing to those described in foregoing Embodiment 1, and the descriptions thereof are thus omitted.

Embodiment 3

In the following, a mobile phone according to Embodiment 3 is described. It is to be noted that, since the mobile phone of present Embodiment 3 can be realized by a similar embodiment including a embodiments of the foregoing mobile phone 10 of Embodiment 1, the similar embodiment is provided with the same numeral and the description thereof is omitted.

The foregoing mobile phone 10 of Embodiment 1 was configured so as to estimate the ambient noise level based upon the sound from the direction other than the direction of the target sound source regardless of whether or not the target sound source is making a sound. As opposed to this, the mobile phone 10 of present Embodiment 3 is configured such that, in the case of the target sound source making a sound, the ambient noise level is estimated based upon the sound from the direction other than the direction of the target sound source, and in the case of the target sound source not making a sound, the ambient noise level is estimated based upon the sound from every direction including the direction of the target sound source.

In the mobile phone 10 of present Embodiment 3, the processing part 1 in FIG. 2, for example, operates as the synchronous subtracting part 13, and acquires a sound signal with the directivity set in the direction of the target sound source (mouth of the speaker). Based upon the sound signal as thus acquired, the processing part 1 determines whether or not the sound from the direction of the target sound source is being received. Namely, the processing part 1 determines whether or not the sound made by the target sound source is being received.

When determining that the sound from the direction of the target sound source is being received, as in Embodiment 1, the processing part 1 acquires a sound signal with directivity of a pattern as illustrated in FIG. 5, and estimates the noise level based upon the acquired sound signal. Namely, the processing part 1 estimates the ambient noise level based upon the sound from the direction other than the direction of the target sound source. Therefore, in the case of the target sound source making a sound, the sound from the direction of the target sound source is not used for the estimation of the noise level, thereby allowing more accurate estimation of a noise level based upon a sound not including the sound from the target sound source (noise).

On the other hand, when determining that the sound from the direction of the target sound source is not being received, the processing part 1 acquires a sound signal with directivity in a wider range than that of the directivity of the pattern as illustrated in FIG. 5, and estimates the noise level based upon the acquired sound signal. Namely, the processing part 1 estimates the ambient noise level for example based upon a sound from every direction including the direction of the target sound source. Therefore, since the noise level is estimated based upon a sound from every direction when the target sound source is not making a sound, it is possible to follow the noise level at high speed even in the case of occurrence of a change in noise level, so as to more accurately estimate the noise level.

In present Embodiment 3, with the foregoing configuration, the noise level is estimated using sounds coming from directions (ranges) which are different between when the sound from the direction of the target sound source is received and when the sound is not being received. This enables accurate estimation of the noise level respectively in the condition of the target sound source making a sound and in the condition of the target sound source not making the sound.

As the method for determining whether or not the sound from the target sound source is being received, a variety of methods can be employed. Examples of the method include: a method of determining that the sound from the direction of the target sound source is not being received in the case of a phase difference spectrum of the acquired sound signals from the first sound input part and the second sound input part; a method of using voiced/voiceless determination to determine the presence or absence of a sound from the direction of the target sound source; and a method of using a difference (SNR) between an input sound level and a noise level estimated with directivity set in directions not including the direction of the target sound source.

Although foregoing Embodiment 3 is described as a modified example of Embodiment 1, it is also applicable to the foregoing embodiment of Embodiment 2.

Embodiment 4

In the following, a mobile phone according to Embodiment 4 is described. It is to be noted that, since the mobile phone of present Embodiment 4 can be realized by a similar embodiment including a embodiment of the foregoing mobile phone 10 of Embodiment 1, the similar embodiment is provided with the same numeral and the description thereof is omitted.

The foregoing mobile phone 10 of Embodiment 1 was configured such that the noise suppression is performed using the suppression amount in accordance with the noise level by changing the suppression-amount control value in accordance with the noise level, to control the range of the directivity. As opposed to this, the mobile phone 10 of present Embodiment 4 is an example of a embodiment so as to determine whether or not the sound from the direction of the target sound source is being received as in forgoing Embodiment 3, and switch a speed at which the range of the directivity is controlled between the case of the sound from the direction of the target sound source being received and the case of the sound not being received.

In the mobile phone 10 of present Embodiment 4, the processing part 1 determines whether or not the sound from the direction of the target sound source is being received. When determining that the sound from the direction of the target sound source is being received, the processing part (control speed shifting part) 1 decreases a speed at which the noise level is updated during its operation as the noise level estimating part 11.

Specifically, when the processing part 1 has determined that the sound from the direction of the target sound source is being received, the level updating part 114 of the noise level estimating part 11 multiples the past noise level by 0.99, multiples the newly calculated noise level by 0.01, and adds up the obtained values, to obtain a value as a new noise level. On the other hand, when the processing part 1 has determined that the sound from the direction of the target sound source is not being received, the level updating part 114 of the noise level estimating part 11 multiples the past noise level by 0.9, multiples the newly calculated noise level by 0.1, and adds up the obtained values, to obtain a value as a new noise level.

With such a configuration, when the sound from the direction of the target sound source is being received, the noise level updating speed based upon the sound signals acquired by the sound input parts 6, 7 can be made slow as compared with the case of not receiving the sound from the direction of the target sound source. Decreasing the noise level updating speed allows a decrease in speed at which the range of the directivity of the sound signal outputted from the synchronous subtracting part 13 is controlled (changed).

Further, when the processing part 1 has determined that the sound from the direction of the target sound source is being received, the noise level estimating part 11 may be made not to perform its operation. In this case, since the noise level is not updated, the processing for controlling the range of the directivity is temporarily stopped, and the range of the directivity is not controlled.

In present Embodiment 4, with the foregoing configuration, when the sound from the direction of the target sound source is being received, the speed at which the range of the directivity is controlled is decreased, or the processing for controlling the range of the directivity is not performed. It is thereby possible to prevent a change in sound quality associated with the change in directivity during the time when the target sound source is making a sound.

Foregoing Embodiment 4 was configured such that decreasing the noise level updating speed that is updated by the level updating part 114 of the noise level estimating part 11 decreases the speed at which the directivity of the received sound is controlled (changed). The embodiment is not restricted to the above, and may for example be such that the noise suppression processing controlling part 12 decreases a speed at which the suppression-amount control value is changed at the time of setting the suppression-amount control value based upon the noise level acquired by the noise level estimating part 11, thereby to decrease the speed at which the directivity of the received sound is controlled.

In addition, foregoing Embodiment 4 was configured such that, when the sound from the direction of the target sound source is being received, the speed at which the range of the directivity is controlled (changed) is decreased or the range of the directivity is not controlled (changed). The embodiment is not restricted to the above, and for example, when the sound from the direction of the target sound source is being received, the speed at which the range of the directivity is controlled may be increased. In this case, it is possible to perform, at high speed, switching to the directivity in accordance with a situation of the target sound source making a sound.

Although foregoing Embodiment 4 was described as a modified example of Embodiment 1, it is also applicable to the foregoing configurations of Embodiments 2 and 3.

Embodiment 5

In the following, a mobile phone according to Embodiment 5 is described. It is to be noted that, since the mobile phone of present Embodiment 5 can be realized by a similar embodiment to that of the foregoing mobile phone 10 of Embodiment 1, the similar embodiment is provided with the same numeral and the description thereof is omitted.

The foregoing mobile phone 10 of each of Embodiments 1 to 4 was configured such that, the larger the noise level, the larger the suppression-amount control value is made, and thereby the larger the noise level, the larger suppression amount is used in performing the noise suppression. Further, in each of foregoing Embodiments 1 to 4, a value of the noise level with the suppression-amount control value being the minimum value (0) or the maximum value (1) was not mentioned.

In present Embodiment 5, it is assumed that the suppression-amount control value is the maximum value (1) when the noise level becomes equal to or larger than a given value (first threshold), and the suppression-amount control value is the minimum value (0) when the noise level becomes smaller than a given value (second threshold).

The setting part 19 determines whether or not the noise level is equal to or larger than the first threshold by use of the noise level inputted from the noise level estimating part 11 through the noise suppression processing controlling part 12 (the level of the noise component, the component value of the noise component), and the suppression-amount control value acquired from the noise suppression processing controlling part 12. When the noise level becomes equal to or larger than the first threshold, the setting part 19 sets, to the suppression-amount control value, a first control value (maximum value, namely "1") so as to control the range of the direction of the signal to be suppressed by the noise suppression processing controlling part 12 as being widest. Further, the setting part 19 determines whether or not the noise level is smaller than the second threshold by use of the noise level and the suppression-amount control value. When the noise level becomes smaller than the second threshold, the setting part 19 sets, to the suppression-amount control value (control value), a second control value (minimum value, namely "0") so as to control the range of the direction of the signal to be suppressed by the noise suppression processing controlling part 12 as being narrowest. The setting part 19 outputs the set suppression-amount control value (control value) back to the noise suppression processing controlling part 12.

When the suppression-amount control value inputted from the setting part 19 differs from the suppression-amount control value already set by the noise suppression processing controlling part 12 by use of the noise level inputted from the noise level estimating part 11, the noise suppression processing controlling part 12 updates the suppression-amount control value to the suppression-amount control value inputted from the setting part 19.

In the mobile phone 10 of present Embodiment 5, the processing part 1 (noise suppression processing controlling part 12) sends the suppression-amount control value in accordance with the noise level to the synchronous subtracting part 13, basically as in Embodiment 1.

When the noise level acquired from the noise level estimating part 11 is smaller than the second threshold, the noise suppression processing controlling part 12 temporarily adds first given values respectively to the first threshold and the second threshold so as to change those thresholds to a new first threshold and a new second threshold. Therefore, even in a case where the noise level having once become smaller than the second threshold increases by a value smaller than the given value, the noise level does not become equal to or larger than the second threshold, and the suppression-amount control value is thus not changed.

Similarly, when the noise level acquired from the noise level estimating part 11 is equal to or larger than the first threshold, the noise suppression processing controlling part 12 temporarily subtracts second given values respectively from the first threshold and the second threshold so as to change those thresholds to a new first threshold and a new second threshold. Therefore, even in a case where the noise level having once become equal to or larger than the first threshold decreases by a value equal to or larger than the given value, the noise level does not become smaller than the changed first threshold, and the suppression-amount control value is thus not changed.

With such a configuration, in the case of the noise level being a value in the vicinity of the first threshold, the noise level is prevented from becoming a value equal to or larger than the first threshold by a small amount of change or the suppression-amount control value is prevented from being sequentially updated due to the noise level becoming a value smaller than the first threshold. Namely, when the noise level once becomes equal to or larger than the first threshold, the noise level is regarded as being equal to or larger than the first threshold during the time until becoming a value smaller than the first threshold by a value equal to or larger than the given value, and the suppression-amount control value is not changed. It is thereby possible to prevent the directivity of the received sound from being frequently switched due to a sequential change in suppression-amount control value in accordance with small fluctuation of the noise level.

Similarly, in the case of the noise level being a value in the vicinity of the second threshold, the noise level is prevented from becoming a value equal to or larger than the second threshold by a small amount of change or the suppression-amount control value is prevented from being sequentially updated due to the noise level becoming a value smaller than the second threshold. Namely, when the noise level once becomes smaller than the second threshold, the noise level is regarded as being smaller than the second threshold during the time until becoming a value larger than the second threshold by a value equal to or larger than the given value, and the suppression-amount control value is not changed. It is thereby possible to prevent the directivity of the received sound from being frequently switched due to a sequential change in suppression-amount control value in accordance with small fluctuation of the noise level.

Embodiment 6

In the following, a mobile phone according to Embodiment 6 is described. It is to be noted that, since the mobile phone of present Embodiment 6 can be realized by embodiments including a similar embodiment of the foregoing mobile phone 10 of Embodiment 1, the similar embodiment is provided with the same numeral and the description thereof is omitted.

The foregoing mobile phone 10 of Embodiment 4 was configured such that, when the sound from the direction of the target sound source is being received, the noise level updating speed is decreased, to decrease the speed at which the directivity of a received sound is controlled. The mobile phone 10 of present Embodiment 6 was configured such that, when the noise level to be estimated any time rapidly changes, the noise updating speed is increased, to increase the speed at which the directivity of the received sound is controlled.

In the mobile phone 10 of present Embodiment 6, the processing part 1 (noise level estimating part 11) regularly updates the noise level, and the level updating part 114 stores the noise level updated last time. When newly acquiring a noise level from the level calculating part 113, the level updating part 114 compares the noise level with the last noise level. The level updating part 114 determines whether or not the acquired new noise level is larger than the last noise level by a value equal to or larger than a given value.

When determining that the acquired new noise level is larger than the last noise level by a value equal to or larger than the given value (e.g. 20 dB), the level updating part 114 increases the noise level updating speed. Specifically, the level updating part 114 multiples the past noise level by 0.9, multiples the newly calculated noise level by 0.1, and adds up the obtained values, to obtain a value as a new noise level. It is to be noted that, when determining that the acquired new noise level is not a value larger than the last noise level by a value equal to or larger than the given value, the level updating part 114 multiples the past noise level by 0.99, multiples the newly calculated noise level by 0.01, and adds up the obtained values, to obtain a value as a new noise level.

With such a configuration, when an amount of change (amount of increase) in noise level becomes equal to or larger than the given value, the noise level updating speed can be made faster as compared with the case of the amount of change in noise level being smaller than the given value. Increasing the noise level updating speed can increase the speed at which the range of the directivity of the sound signal outputted from the synchronous subtracting part 13 is controlled (changed). Therefore, even when the noise level rapidly increases, it is possible to perform, at high speed, shifting of the directivity to one in accordance with the noise environment.

In addition, foregoing Embodiment 6 was configured such that, when the amount of increase in noise level becomes equal to or larger than the given amount, the noise level changing speed is increased, to increase the speed at which the range of the directivity is controlled. Other than such a configuration, for example, the embodiment may be such that, when an amount of decrease in noise level is equal to or larger than a given amount, the noise level changing speed is increased, to increase the speed at which the range of the directivity is controlled. In this case, even when the surroundings rapidly become quiet, it is possible to perform, at high speed, shifting of the directivity to directivity in accordance with the noise environment.

Embodiment 7

In the following, a mobile phone according to Embodiment 7 is described. It is to be noted that, since the mobile phone of present Embodiment 7 can be realized by a similar embodiment to that of the foregoing mobile phone 10 of Embodiment 1, the similar embodiment is provided with the same numeral and the description thereof is omitted.

The foregoing mobile phone 10 of each of Embodiments 1 to 4 was configured so as to suppress noise by performing the synchronous subtraction on a sound signal on the time axis. However, the noise suppressing processing is not restricted to such a embodiment using the synchronous subtraction. The mobile phone 10 of present Embodiment 7 is configured so as to suppress noise by converting a sound signal on the time axis to a sound signal on the frequency axis and correcting an amplitude component of the sound signal on the frequency axis.

Figure 9:
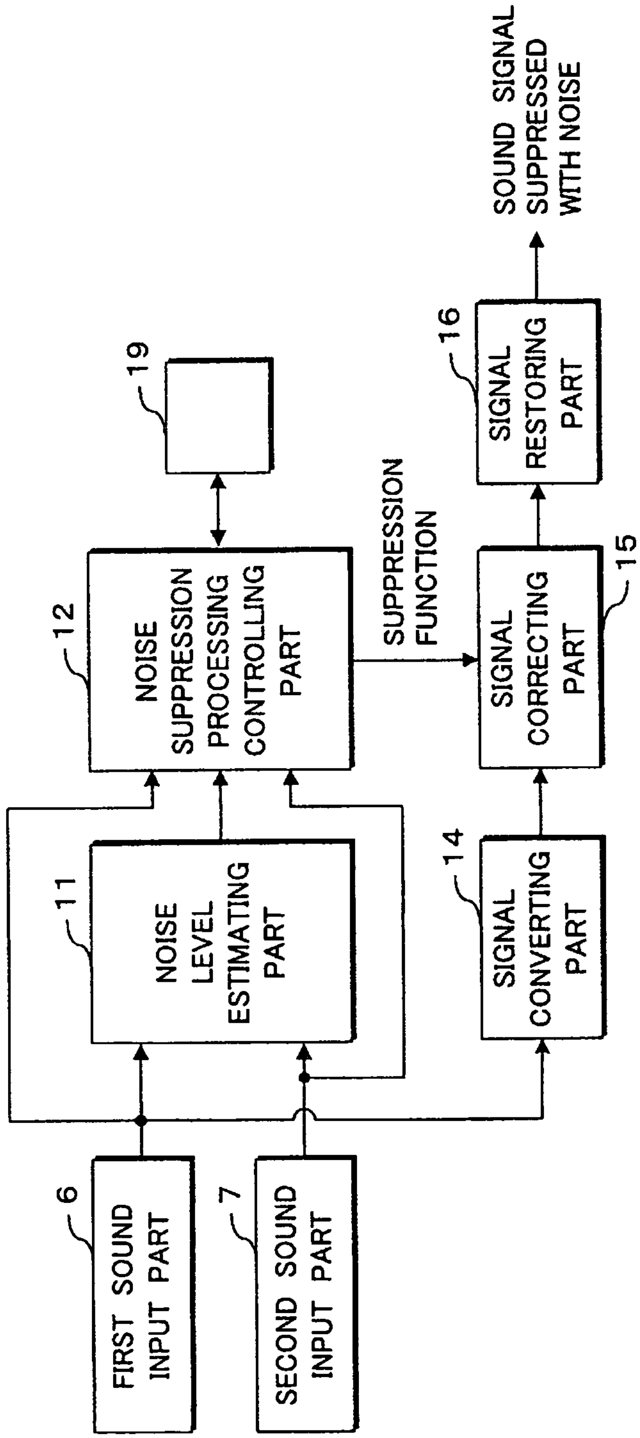
FIG. 9 is a functional block diagram illustrating an example of a functional configuration of a mobile phone of Embodiment 7.

Referring to FIG. 9, in the mobile phone 10 of present Embodiment 7, the processing part 1 has respective functions of a signal converting part 14, a signal correcting part 15, a signal restoring part 16, and the like, in place of the synchronous subtracting part 13 in the functions illustrated in FIG. 3.

It is to be noted that the noise suppression processing controlling part 12 of present Embodiment 7 sets a suppression function in accordance with the noise level acquired from the noise level estimating part 11 using a signal from the first sound input part and the second sound input part, and sends the set suppression function to the signal correcting part 15. The suppression function regulates a suppression amount in accordance with a frequency, and a plurality of suppression functions in accordance with the noise level are previously stored in the RAM 3 or the like. Further, the suppression function is a function for regulating a suppression amount with which the sound from the direction other than the direction of the target sound source is suppressed, and the suppression function is set such that the larger the noise level, the larger the suppression amount of the noise to be suppressed by the signal correcting part 15 becomes.

As for the sound signal inputted from the first sound input part 6, the signal converting part 14 converts the sound signal on the time axis to a sound signal on the frequency axis (spectrum), and sends the obtained spectrum to the signal correcting part 15. It should be noted that the signal converting part 14 executes time-frequency conversion processing, such as Fourier transform.

The signal correcting part 15 calculates an amplitude component (amplitude spectrum) of the spectrum acquired from the signal converting part 14. Further, the signal correcting part 15 multiplies the calculated amplitude component by the suppression function acquired from the noise suppression processing controlling part 12, to correct the sound signal on the frequency axis. The signal correcting part 15 sends the corrected sound signal on the frequency axis to the signal restoring part 16.

The signal restoring part 16 converts the sound signal on the frequency axis, acquired from the signal correcting part 15, to a sound signal on the time axis and sends the converted signal to a given output destination. It should be noted that the signal restoring part 16 executes inverse conversion processing to the conversion processing that is performed by the signal converting part 14, such as inverse Fourier transform.

Figure 10A:
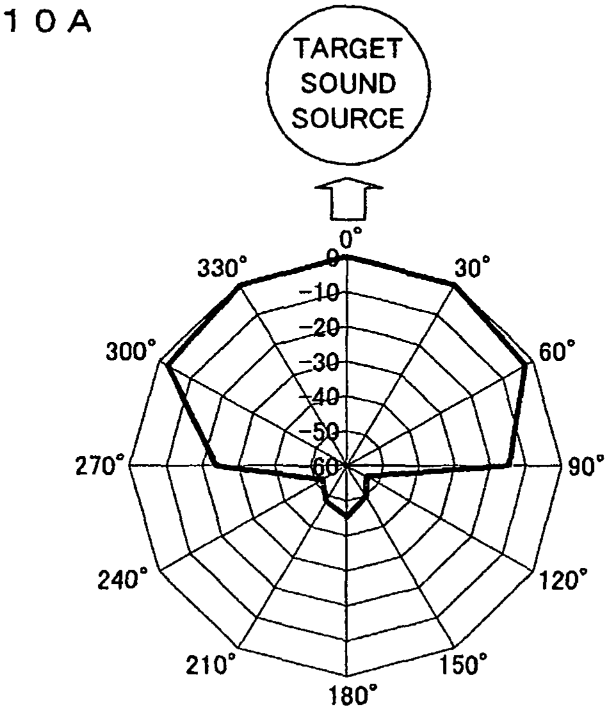
FIG. 10A is a schematic view illustrating an example of a pattern of directivity of a sound signal with an amplitude spectrum corrected by a suppression function.
Figure 10B:
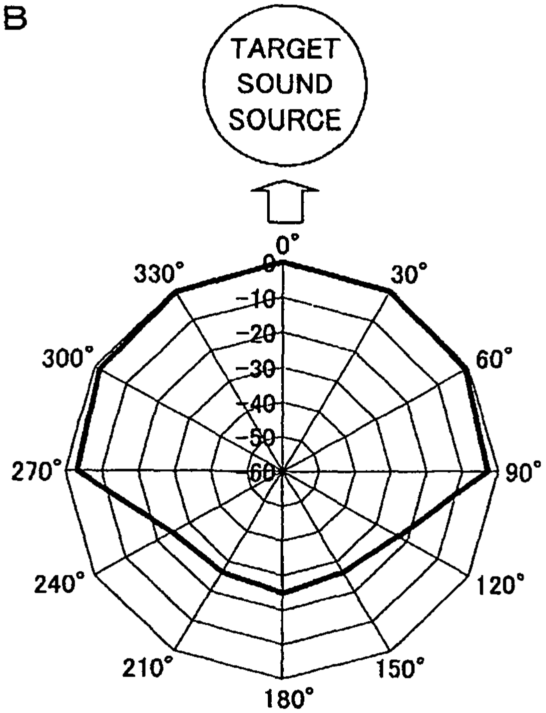
FIG. 10B is a schematic view illustrating another example of a pattern of the directivity of the sound signal with the amplitude spectrum corrected by a suppression function.
Figure 11:
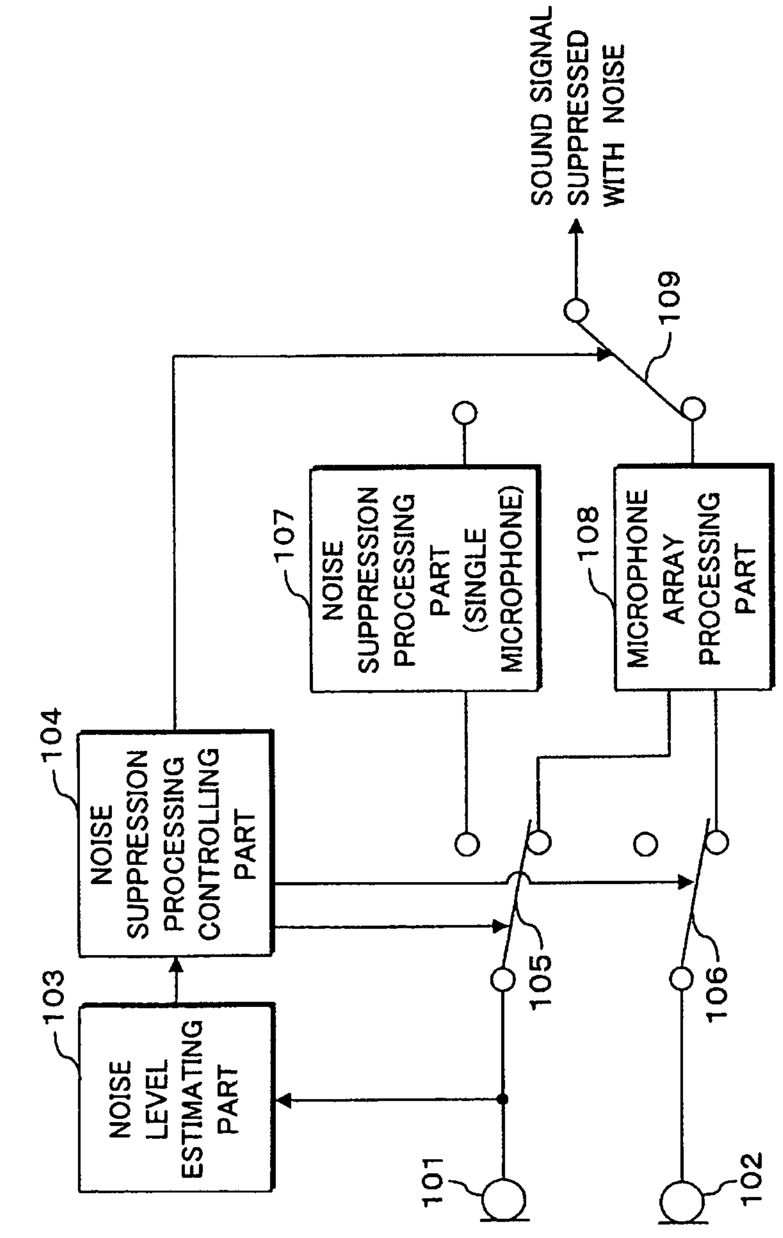
FIG. 11 RELATED ART
FIG. 11 is a block diagram illustrating an example of a configuration of a conventional noise suppressing device.

According to the foregoing configuration, the sound signal with noise suppressed by the signal correcting part 15 is a sound signal having directivity as illustrated in FIG. 10A and FIG. 10B. FIG. 10A illustrates a pattern of the case of narrow directivity, and FIG. 10B illustrates a pattern of the case of wide directivity. As in the patterns illustrated in FIG. 5 and FIG. 6, the patterns illustrated in FIG. 10A and FIG. 10B each indicate a suppression amount with respect to a sound coming from each direction at every 30 degrees clockwise with the direction of the target sound source regarded as a reference in the range of 360 degrees in a horizontal direction with the mobile phone 10 regarded as the center.

The directivity of the pattern illustrated in FIG. 10A is directivity in the case of the high noise level and noisy surroundings. Namely, in the case of the noisy surroundings, suppressing sound signals from lateral direction with respect to the direction of the target sound source and from the inverse direction to the direction of the target sound source gives a sound signal in which the sound signal from the target sound source is emphasized. Therefore, in the case of the noisy environment, it is possible to sufficiently suppress noise by suppressing not only the sound signals from the inverse direction to the direction of the target sound source but the sound signal from the lateral direction with respect to the direction of the target sound source.

Further, the directivity of the pattern illustrated in FIG. 10B is directivity in the case of the low noise level and quiet surroundings. Namely, in the case of the quiet surroundings, suppressing a sound signal from the inverse direction to the direction of the target sound source gives a sound signal in which sound signals from the direction of the target sound source and from the lateral direction with respect to the direction of the target sound source are emphasized. Therefore, in the case of the quiet surroundings, it is possible to prevent deterioration in sound quality due to noise suppression by suppressing the sound signals from the inverse direction to the direction of the target sound source while not suppressing the sound signal from the lateral direction with respect to the direction of the target sound source.

Further, in the case of estimating the noise level with directivity of a pattern as illustrated in FIG. 10A and FIG. 10B set in the inverse direction to the direction of the target sound source, the sound from the target sound is not erroneously used for the estimation of the noise level, thereby enabling stable noise suppressing processing based upon an accurate noise level.

In the noise suppressing devices according to the embodiments, it is possible to accurately estimate the ambient noise level by use of information on the direction of the given sound source, information on the distance with the given sound source, and the like, so as to control the direction of the received sound in accordance with the estimated level. It is thereby possible to adequately shift the direction of the received sound between the case of a quiet ambient environment and the case of a noisy ambient environment. Hence, for example in the quiet environment, the range of an object as the received sound is made wide and the sound is received with directivity causing few occurrences of distortion, thereby allowing generation of a sound signal with a favorable sound quality. Further, in the noisy environment, the range of the object as the received sound is made narrow and the sound is received with directivity emphasizing the suppression amount of the noise component, thereby allowing alleviation of deterioration in target sound quality due to the noise.

As this description may be embodied in several forms without departing from the spirit of essential characteristics thereof, the present embodiment is therefore illustrative and not restrictive, since the scope of the description is defined by the appended claims rather than by description preceding them, and all changes that fall within metes and bounds of the claims, or equivalence of such metes and bounds thereof are therefore intended to be embraced by the claims.

What is claimed is:

1. A noise suppressing device for suppressing a noise component included in a sound, comprising:

at least two sound receiving parts receiving sounds from a plurality of directions containing a sound from a direction of a given sound source and converting the sounds to digital sound signals in a time domain, respectively;

an estimating part acquiring direction information on a direction of the given sound source, determining a signal from a direction other than the direction of the given sound source among the digital sound signals converted by the at least two sound receiving parts based upon the acquired direction information and estimating an ambient noise level contained in the digital sound signal based on the determined signal from the direction other than the direction of the given sound source;

a controlling part acquiring, in accordance with the estimated ambient noise level, a control value of a suppression amount for controlling a range of a direction of the digital sound signals, which are converted by the at least two sound receiving parts, to be suppressed, such that the suppression amount is small when the ambient noise level is low and the suppression amount is large when the ambient noise level is high;

a suppressing part suppressing a signal from a direction other than the direction of the given sound source by use of the ambient noise level and the control value; and an outputting part outputting a signal in which the signal from the direction other than the direction of the given sound source is suppressed, wherein the suppressing part suppresses, in accordance with the control value acquired by the controlling part, a digital sound signal converted from a sound received from a direction other than the direction of the given sound source among the digital sound signals, without suppressing a digital sound signal converted from a sound received from the direction of the given sound source.

2. The noise suppressing device according to claim 1, further comprising a part determining whether or not the sound from the direction of the given sound source is being received based upon the digital sound signals converted by the sound receiving parts, wherein the estimating part estimates the ambient noise level based upon digital sound signals to which the sound receiving parts convert sounds from the directions other than the direction of the given sound source when it is determined that the sound from the direction of the given sound source is being received.

3. The noise suppressing device according to claim 1, wherein the estimating part includes:

a part obtaining a difference between signal levels of the signals converted by the plurality of sound receiving parts having received the sound from the direction of the given sound source, and calculating distance information on a distance from the given sound source based upon the difference; and a detecting part detecting, from the sound signals, a sound component with the calculated difference between the signal levels being less than a given value, and the estimating part estimates the ambient noise level based upon the component value of the sound component detected by the detecting part.

4. The noise suppressing device according to claim 1, wherein the controlling part controls the suppressing part so as to suppress a sound signal from a wider range with a larger ambient noise level estimated by the estimating part.

5. The noise suppressing device according to claim 1, further comprising a setting part:

setting, to the control value in the controlling part, a first control value for controlling the range of the direction of the signal to be suppressed as being widest when the ambient noise level becomes equal to or greater than a first threshold; and setting, to the control value in the controlling part, a second control value for controlling the range of the direction of the signal to be suppressed as being narrowest when the ambient noise level becomes smaller than a second threshold.

6. The noise suppressing device according to claim 5, wherein the controlling part respectively changes the first threshold and the second threshold to values obtained by respectively adding first given values to the first threshold and the second threshold when the ambient noise level estimated by the estimating part becomes smaller than the second threshold, and the controlling part respectively changes the first threshold and the second threshold to values obtained by respectively subtracting second given values from the first threshold and the second threshold when the ambient noise level estimated by the estimating part becomes equal to or greater than the first threshold.

7. The noise suppressing device according to claim 1, further comprising:

a part determining whether or not the sound from the direction of the given sound source is being received based upon the digital sound signals converted by the sound receiving parts; and a control speed changing part changing a control speed at which the control part controls the suppressing part when it is determined that the sound from the direction of the given sound source is being received.

8. The noise suppressing device according to claim 7, wherein the control speed changing part makes the controlling part decrease the control speed or prevents the controlling part from controlling the suppressing part when it is determined that the sound from the direction of the given sound source is being received.

9. The noise suppressing device according to claim 1, wherein the estimating part estimates the ambient noise level with a given time interval, the noise suppressing device includes a part determining whether or not an amount of change in the ambient noise level estimated by the estimating part with the given time interval is equal to or greater than a given amount, and the noise suppressing device makes the controlling part increase a control speed at which the controlling part controls the suppressing part when it is determined that the amount of change is equal to or greater than the given amount.

10. A mobile phone, comprising:

the noise suppressing device according to claim 1, wherein the plurality of sound receiving parts are microphones.

11. A voice processing device, comprising:

the noise suppressing device according to claim 1; and a part performing given processing on a sound signal acquired by the noise suppressing device, wherein the plurality of sound receiving parts are microphones.

12. A noise suppressing method for causing a noise suppressing device to suppress a noise component included in digital sound signals in a time domain to which sounds from a plurality of directions containing a sound from a direction of a given sound source are converted by corresponding sound receiving parts which the noise suppressing device includes, comprising:

acquiring direction information on a direction of the given sound source, determining a signal from a direction other than the direction of the given sound source among the digital sound signals converted by the sound receiving parts based upon the acquired direction information, and estimating an ambient noise level included in the digital sound signals based on the determined signal from the direction other than the direction of the given sound source;

acquiring, in accordance with the estimated ambient noise level, a control value of a suppression amount for controlling a range of a direction of the digital sound signals, which are converted by the corresponding sound receiving parts, to be suppressed, such that the suppression amount is small when the ambient noise level is low and the suppression amount is large when the ambient noise level is high;

suppressing a signal from a direction other than the direction of the given sound source by use of the ambient noise level and the control value; and outputting a signal in which the signal from the direction other than the direction of the given sound source is suppressed, wherein the noise suppressing device suppresses, in accordance with the acquired control value, a digital sound signal converted from a sound received from a direction other than the direction of the given sound source among the digital sound signals, without suppressing a digital sound signal converted from a sound received from the direction of the given sound source.

13. A non-transitory computer-readable recording medium storing a computer-executable program for causing a computer to suppress a noise component included in digital sound signals in a time domain to which sounds from a plurality of directions containing a sound from a direction of a given sound source are converted by corresponding sound receiving parts which the computer includes, the program when executed causing the computer to perform a process comprising:

acquiring direction information on a direction of the given sound source, determining a signal from a direction other than the direction of the given sound source among the digital sound signals converted by the sound receiving parts based upon the acquired direction information, and estimating an ambient noise level included in the signals based upon the determined signal from the direction other than the direction of the given sound source;

acquiring, in accordance with the estimated ambient noise level, a control value of a suppression amount for controlling a range of a direction of the digital sound signals, which are converted by the corresponding sound receiving parts, to be suppressed, such that the suppression amount is small when the ambient noise level is low and the suppression amount is large when the ambient noise level is high;

suppressing a signal from a direction other than the direction of the given sound source by use of the ambient noise level and the control value; and outputting a signal in which the signal from the direction other than the direction of the given sound source is suppressed, wherein the program comprises a process of suppressing, in accordance with the acquired control value, a digital sound signal converted from a sound received from a direction other than the direction of the given sound source among the digital sound signals, without suppressing a digital sound signal converted from a sound received from the direction of the given sound source.

14. A noise suppressing device for suppressing a noise component included in a signal, comprising:

at least two sound receiving parts receiving sounds from a plurality of directions containing a sound from a direction of a given sound source and converting the sounds to digital sound signals in a time domain, respectively; and a processor configured to perform the following operations of:

acquiring direction information on a direction of the given sound source, determining a signal from a direction other than the direction of the given sound source among the digital sound signals converted by the sound receiving parts based upon the acquired direction information, and estimating an ambient noise level contained in the signal based upon the determined signal from the direction other than the direction of the given sound source;

acquiring, in accordance with the estimated ambient noise level, a control value of a suppression amount for controlling a range of a direction of the digital sound signals, which are converted by the at least two sound receiving parts, to be suppressed, such that the suppression amount is small when the ambient noise level is low and the suppression amount is large when the ambient noise level is high;

suppressing a signal from a direction other than the direction of the given sound source by use of the ambient noise level and the control value; and outputting a signal in which the signal from the direction other than the direction of the given sound source is suppressed, wherein the processor is configured to perform the operation of suppressing, in accordance with the acquired control value, a digital sound signal converted from a sound received from a direction other than the direction of the given sound source among the digital sound signals, without suppressing a digital sound signal converted from a sound received from the direction of the given sound source.

15. A noise suppressing device for suppressing a noise component included in a signal, comprising:

at least two sound receiving parts receiving sounds from a plurality of directions containing a sound from a direction of a given sound source and converting the sounds to digital sound signals in a time domain, respectively;

means for acquiring direction information on a direction of the given sound source, determining a signal from a direction other than the direction of the given sound source among the digital sound signals converted by the at least two sound receiving parts based upon the acquired direction information, and estimating an ambient noise level contained in the signal based upon the determined signal from the direction other than the direction of the given sound source;

means for acquiring, in accordance with the estimated ambient noise level, a control value of a suppression amount for controlling a range of a direction of the digital sound signals, which are converted by the at least two sound receiving parts, to be suppressed, such that the suppression amount is small when the ambient noise level is low and the suppression amount is large when the ambient noise level is high;

means for suppressing a signal from a direction other than the direction of the given sound source by use of the ambient noise level and the control value; and means for outputting a signal in which the signal from the direction other than the direction of the given sound source is suppressed, wherein the means for suppressing suppresses, in accordance with the acquired control value, a digital sound signal converted from a sound received from a direction other than the direction of the given sound source among the digital sound signals, without suppressing a digital sound signal converted from a sound received from the direction of the given sound source.

* * * * *